United States Patent
Kim et al.

(10) Patent No.: US 8,068,510 B2
(45) Date of Patent: Nov. 29, 2011

(54) DEMODULATION APPARATUS FOR EFFICIENTLY EMBODYING ADAPTIVE MODULATION AND CODING METHOD IN OFDMA BASED PACKET COMMUNICATION SYSTEM AND METHOD THEREOF

(75) Inventors: Jun-Woo Kim, Daejeon (KR); Young-Hoon Kim, Daejeon (KR); Su-Chang Chae, Daejeon (KR); Youn-Ok Park, Daejeon (KR)

(73) Assignees: Electronics and Telecommunications Research Institute (KR); Samsung Electronics Co., Ltd (KR); KT Corporation (KR); SK Telecom., Ltd (KR); Ktfreetel Co., Ltd (KR); Hanaro Telecom., Inc. (KR)

( * ) Notice: Subject to any disclaimer, the term of this patent is extended or adjusted under 35 U.S.C. 154(b) by 871 days.

(21) Appl. No.: 10/583,167

(22) PCT Filed: Nov. 3, 2004

(86) PCT No.: PCT/KR2004/002816
§ 371 (c)(1),
(2), (4) Date: May 25, 2007

(87) PCT Pub. No.: WO2005/060109
PCT Pub. Date: Jun. 30, 2005

(65) Prior Publication Data
US 2007/0248002 A1    Oct. 25, 2007

(30) Foreign Application Priority Data
Dec. 18, 2003  (KR) .................. 10-2003-0093281

(51) Int. Cl.
*H04Q 11/02* (2006.01)
(52) U.S. Cl. ...................................... 370/430; 375/219
(58) Field of Classification Search ................. 370/352; 375/219; 709/225
See application file for complete search history.

(56) References Cited

U.S. PATENT DOCUMENTS

| | | | |
|---|---|---|---|
| 6,226,333 B1 | 5/2001 | Spalink | |
| 2002/0087685 A1* | 7/2002 | Lassen et al. | 709/225 |
| 2002/0114379 A1* | 8/2002 | Uesugi et al. | 375/219 |
| 2002/0136207 A1* | 9/2002 | Matsumoto et al. | 370/352 |

FOREIGN PATENT DOCUMENTS
WO    WO 02/078232    10/2002

* cited by examiner

*Primary Examiner* — Jason Mattis
*Assistant Examiner* — Joseph Bednash
(74) *Attorney, Agent, or Firm* — The Farrell Law Firm, P.C.

(57) ABSTRACT

Disclosed is a demodulation apparatus for receiving signals by an adaptive modulation and coding method, and demodulating the signals, in an OFDMA based packet communication system, comprising: a QAM demapper for performing QAM demapping to the received signals by a modulation method using a maximum modulation ratio, until modulation methods for each of sub-channels are analyzed; a slot buffer for storing the data outputted from the QAM demapper; a channel decoder for decoding the data stored in the slot buffer and analyzing modulation methods for each sub-channels and transferring the analyzed modulation methods to the QAM demapper; and in at the same time, reading valid data from the data stored in the slot buffer, based on the analyzed modulation methods for each sub-channels, and demodulating the valid data.

12 Claims, 8 Drawing Sheets

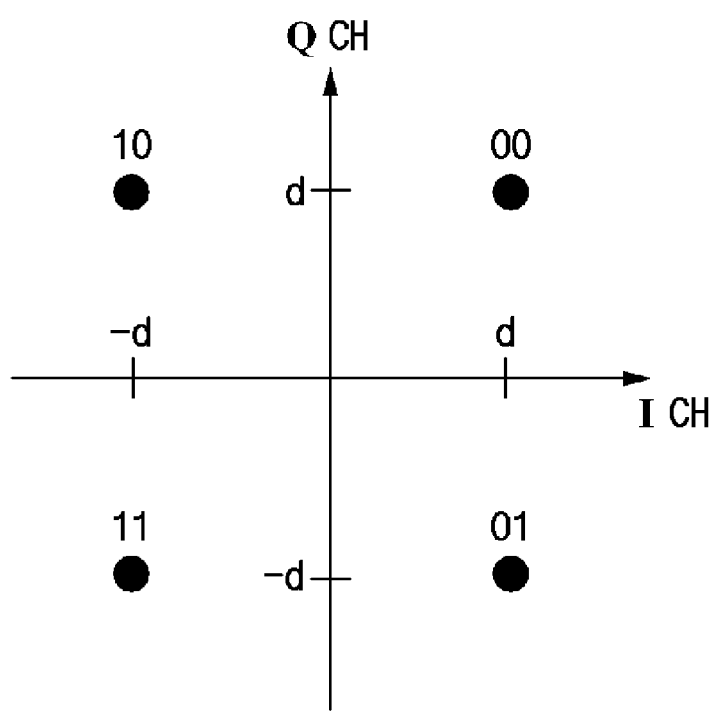
[Fig. 4]

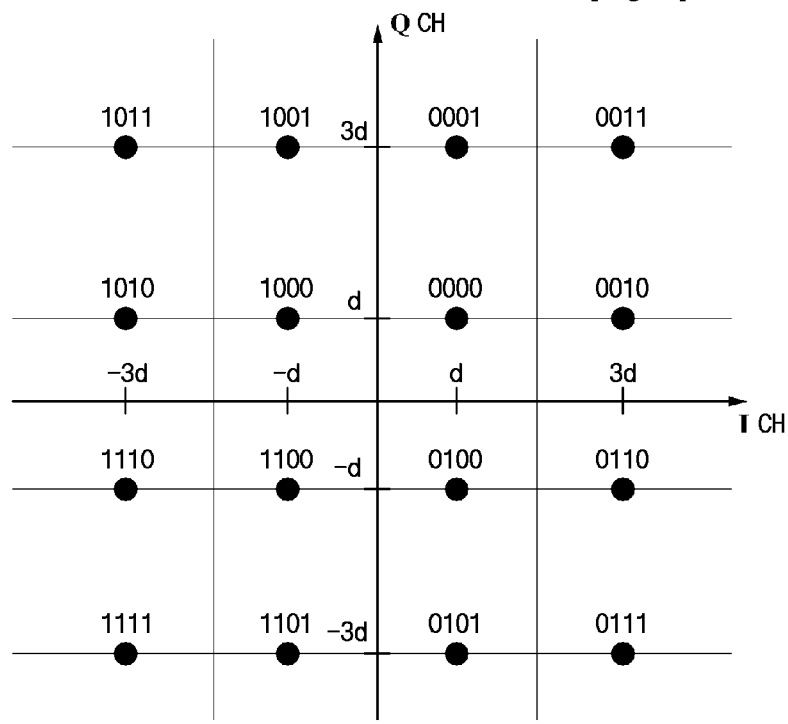
[Fig. 5]
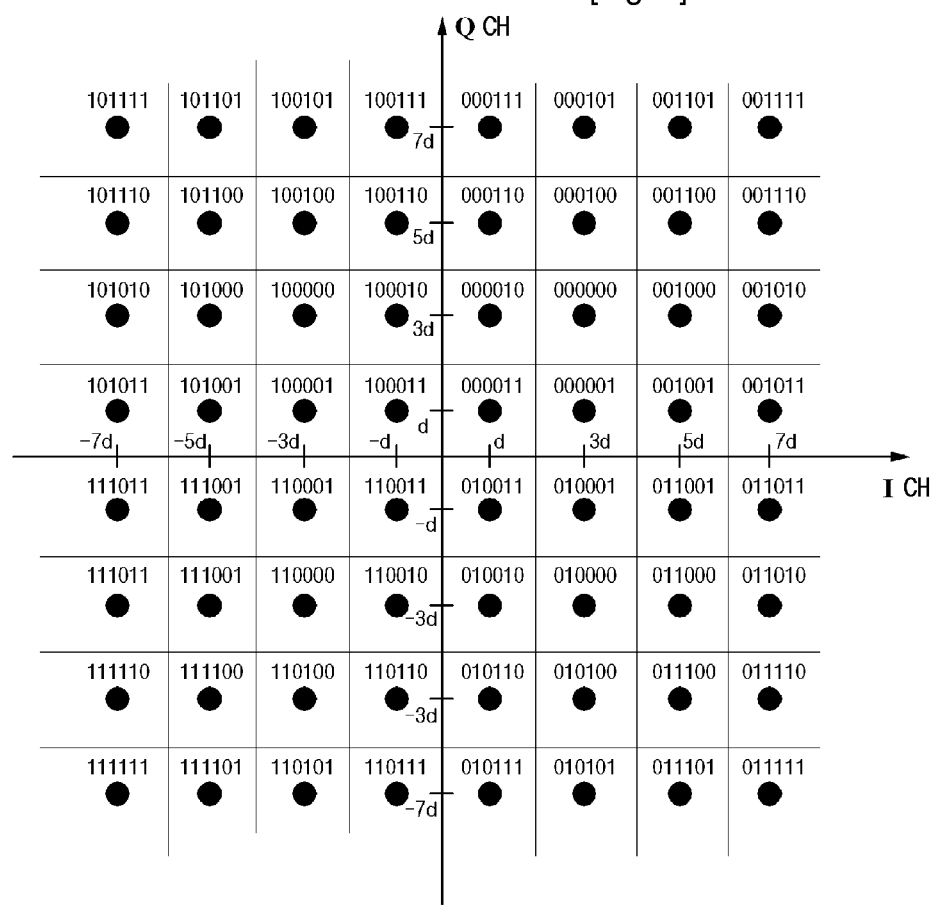
[Fig. 6]

[Fig. 7]
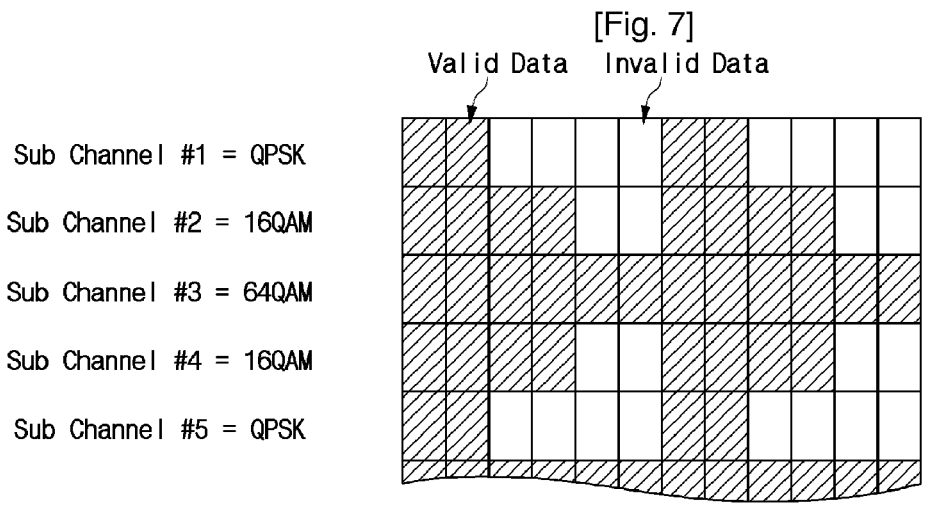
[Fig. 8]
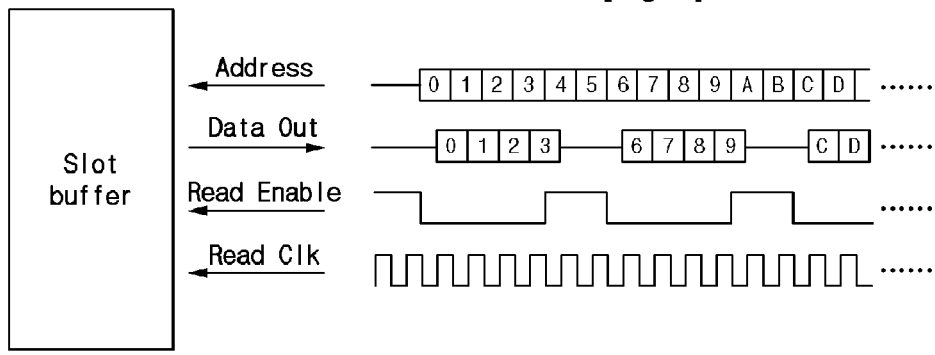
[Fig. 9]
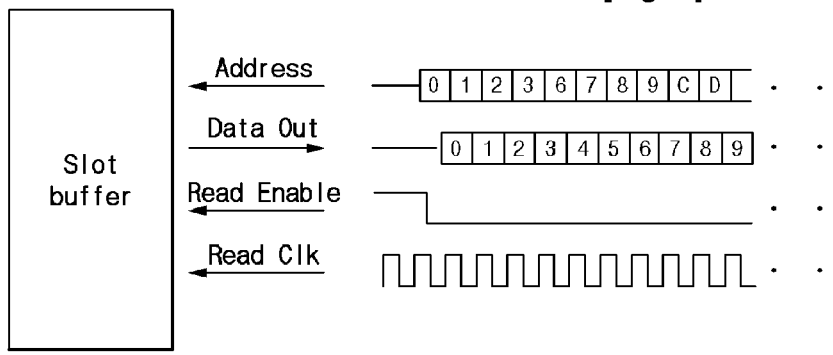

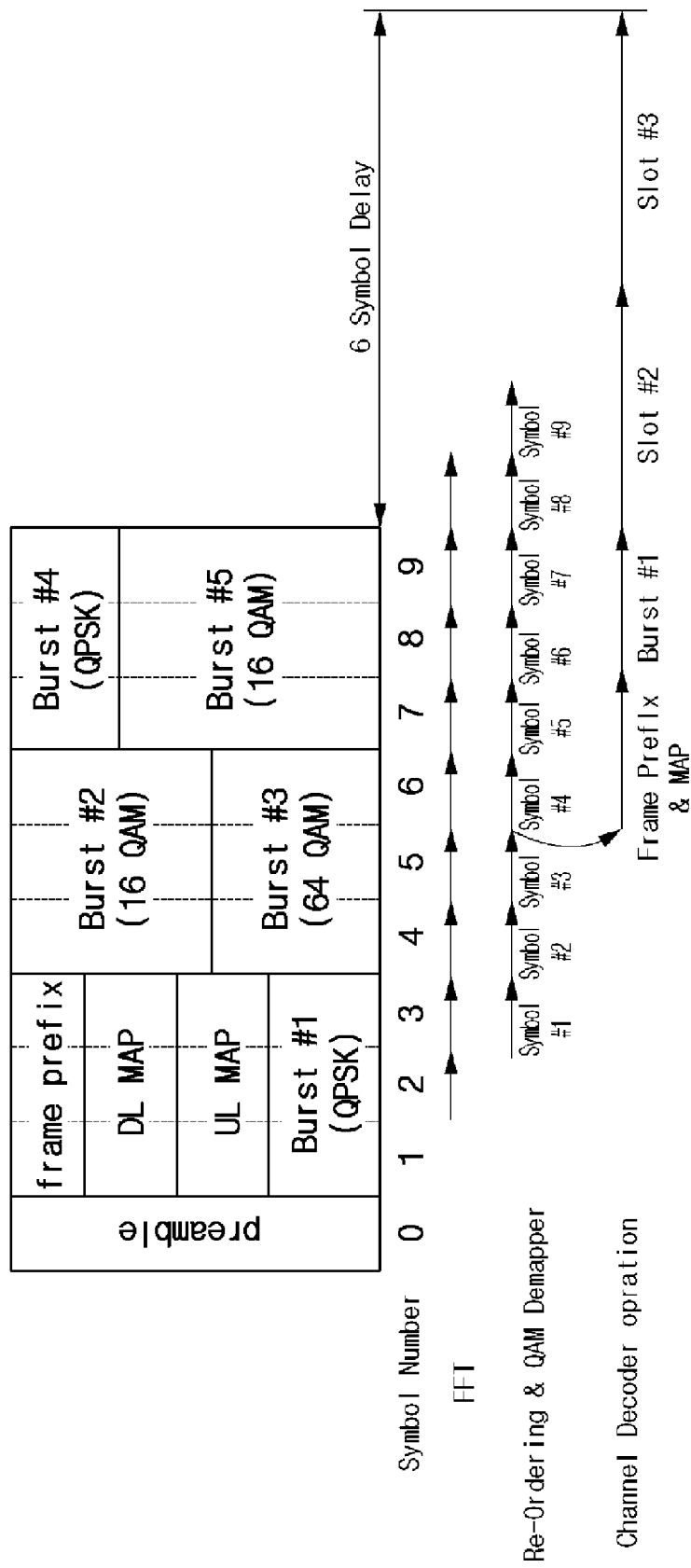
[Fig. 11]

DEMODULATION APPARATUS FOR EFFICIENTLY EMBODYING ADAPTIVE MODULATION AND CODING METHOD IN OFDMA BASED PACKET COMMUNICATION SYSTEM AND METHOD THEREOF

TECHNICAL FIELD

This application claims priority to and the benefit of Korea Patent Application No. 2003-93281 filed on Dec. 18, 2003 in the Korean Intellectual Property Office, the entire content of which is incorporated herein by reference.

The present invention relates to a demodulation apparatus in an OFDMA (Orthogonal Frequency Division Multiplexing Access) based packet communication system, and a method thereof. More specifically, the present invention relates to a de-modulation apparatus in an OFDMA based packet communication system and a method thereof, to which an adaptive modulation and coding method is applied, and which demodulates received packets with a minimum delay.

BACKGROUND ART

In general, an OFDMA system uses an adaptive modulation and coding method, which selects a different modulation and coding method depending on a change of channel states per sub-channel while performing a speed packet communication.

FIG. 1 shows an example of a packet in which an adaptive modulation and coding method is applied to in a general OFDMA system.

As referred to in FIG. 1, at least one of preamble symbol are is located to the head of each packet, and are used for acquirement of initial synchronization, calculation of frequency offset, and recognition of Cell ID, etc.

Data symbols of the packet follow the preamble, and several continuous data symbols gather and form one slot. The reason for forming the slot is that at least 3 symbols are needed to assign a data block given to a channel codec to one sub-channel, since the length of one symbol is not enough for the assignment.

Next, a frame prefix is located in the front of the data slot, this information is being constructed by the QPSK (Quadrature Phase Shift Keying) method, and it includes a location information and size information of a MAP information. Following the frame prefix, a DL MAP and a UL MAP are located, and the DL MAP describes a modulation method and a channel coding method applied to each sub-channel in a downlink, and the UL MAP describes a modulation method and a channel coding method applied to each sub-channel in an uplink. Data bursts following the DL MAP and the UL MAP are modulated by various methods predetermined in the MAP.

This frame construction is adopted by IEEE 802.16a.

FIG. 2 shows a construction of a modulator for modulating a packet to which an adaptive modulation and coding method is applied to in a general OFDMA system.

As referred to in FIG. 2, the received OFDMA packet is transformed in a Fast Fourier Transform (FFT) device by an FFT method, and a channel for the packet is estimated and is equalized in an equalizer 23 through a re-ordering buffer 22. The channel is QAM demapped in a QAM (Quadrature Amplitude Modulation) demapper 25 and is channel decoded in a channel decoder 27 through a slot buffer 26, and is finally demodulated.

Meanwhile, there are several buffers 24 the before QAM demapper 25. Since modulation methods for each sub-channel are described in the MAP area, it is necessary to understand the contents for the QAM demapping process. Thus the data symbols are needed to be delayed in the buffers during when the channel decoder 27 analyzes the frame prefix and the MAP information.

FIG. 3 shows action timing for modulating a packet in the modulator shown in FIG. 2. FIG. 3 indicates an order and the time required for modulating the packet frame shown in FIG. 1 by the modulator of FIG. 2.

As referred to in FIG. 3, the delay by the FFT 21 and the delay by the re-ordering buffer 22 corresponds to each symbols, and in the case all the FFT for the first slot are is finished, the information of the frame prefix are is analyzed by the channel decoder 27 and the location and size of the MAP information can be found. First, It is needed to perform the QAM demapping process and the channel decoding to the sub-channels on which the MAP information are loaded on, and determine the modulation method and the channel coding method for each sub-channels, in order to perform the QAM demapping process to the data bursts.

A significant time delay occurs in this process, since the next stage can not be started until each stage is finished. It is shown in FIG. 3 that the delay of about 11 symbols occurs. This delay depends on the construction of the system. In particular, this delay increases along the length of the slot. Thus, the analysis for the frame prefix and the MAP information can not be started first, since the modulation is performed for each symbol before the channel decoder 27, however, the channel decoder performs decoding for each slot.

As a conventional method using an adaptive modulation and coding method, there is a Korea Patent Publication No. 2003-69299 entitled An adaptive modulation and coding method for a mobile communication system. The invention actively responds to the channel circumstance being changed in the wideband high speed mobile communication and adopts an AMC (Adaptive Modulation Coding) and an STC (Space Time Coding) at the same time.

DISCLOSURE OF INVENTION

Technical Problem

However, the inventions disclose only brief a concept for adopting the AMC method to the mobile communication. The invention can not solve the delay occurring at the receiving end, in the case the AMC method is adapted to the communication by the OFDMA method.

Technical Solution

The objective of the present invention is to provides an apparatus for coding of variable bitrate wideband speech and audio, and a method thereof, which can minimize loss of sound quality by assigning bits for coding to the a high frequency band in even at a low bitrate.

To achieve the objective, the one aspect of the present invention is provides a demodulation apparatus for receiving signals by an adaptive modulation and coding method, and demodulating the signals, in an OFDMA based packet communication system, comprising: a QAM demapper for performing a QAM (Quadrature Amplitude Modulation) demapping process to the received signals by a modulation method using a maximum modulation ratio, and outputting data, until modulation methods for each of sub-channels are analyzed; a slot buffer for storing the data outputted from the QAM demapper for each slot; and a channel decoder for decoding the data stored in the slot buffer and analyzing modulation methods for each sub-channels and transferring the analyzed modulation methods to the QAM demapper; and reading valid data from the data stored in the slot buffer, based on the analyzed modulation methods for each sub-channels and demodulating the valid data and outputting the demodulated data.

Here, the channel decoder controls read enable signals for controlling the data output stored in the slot buffer, and reads the valid data from the slot buffer.

Further, the channel decoder selectively outputs addresses being accessed to only valid data from among the data stored in the slot buffer, and reads the valid data from the slot buffer.

Further, the slot buffer comprises: a first slot buffer for storing data outputted from the QAM demapper until the modulation methods for each sub-channels of the received signals are analyzed by the channel decoder; and a second slot buffer for storing data outputted from the QAM demapper, once the modulation methods for each sub-channels of the received signals are analyzed by the channel decoder.

Further, the first slot buffer stores the data demapped by the modulation method using the maximum modulation ratio in the QAM demapper; and the second slot buffer stores the data demapped by the modulation methods analyzed for each sub-channels in the QAM demapper.

Further, the channel decoder reads the MAP information in the former part of a frame among the symbol data stored in the slot buffer, and analyzes the modulation methods for each sub-channels.

Further, the QAM demapper performs a demapping process to the received signals by the modulation methods for each sub-channel, and stores the output data in the slot buffer, once the modulation methods for each sub-channel are analyzed by the channel decoder.

Here, in the case data are demodulated by the modulation method using the maximum modulation ratio, a constellation for part of the data are is identical with a constellation for the data demodulated by the modulation methods for each sub-channels.

Another aspect of the present invention is provides a demodulation method for receiving signals by an adaptive modulation and coding method and demodulating the signals, in an OFDMA based packet communication system, comprising: a) performing a demapping process to the received signals by a modulation method using a maximum modulation ratio and storing the signals; b) decoding the demapped and stored signals the data and analyzing the modulation methods for each of sub-channels; and c) performing a demapping process on the received signals by the analyzed modulation methods for each sub-channels and demodulating the signals.

Here, the signals are stored in stag a) until the modulation methods for each sub-channels are analyzed; only valid data from among the signals are read by the modulation methods for each sub-channels analyzed in stage b); and the valid data are demodulated.

Advantageous Effects

As such, the present invention demodulates the receive signals by using the property of the QAM demodulation, and thus it is possible to demodulate the packet frame by a minimum time delay in an OFDMA system to which an adaptive modulation and coding method is applied.

Further, the buffer located before the QAM demapper for awaiting analysis of the modulation method by the channel decoder is removed, and it is possible to reduce the area of the demodulation device hardware.

BRIEF DESCRIPTION OF THE DRAWINGS

The accompanying drawings, which are incorporated in and constitute a part of the specification, illustrate an embodiment of the invention, and, together with the description, serve to explain the principles of the invention.

FIG. 4~6 shows a constellation by a QAM demapper which is used in the general OFDMA based packet communication system. FIG. 4 indicates a constellation by QPSK, and FIG. 5 indicates a constellation by 16 QAM, and FIG. 6 indicates a constellation by 64 QAM.

FIG. 7 shows a data construction stored in a slot buffer in a modulation method of a QFDMA based packet communication system according to the present invention.

FIGS. 8 and 9 shows a method for reading valid data from data in the slot buffer shown in FIG. 7, and relates to the case of 16 QAM. FIG. 8 shows an example using a readable signal, and FIG. 9 shows an example using a read address.

FIG. 11 shows action timing for modulating a packet in the modulator shown in FIG. 10.

BEST MODE FOR CARRYING OUT THE INVENTION

Figure 1:
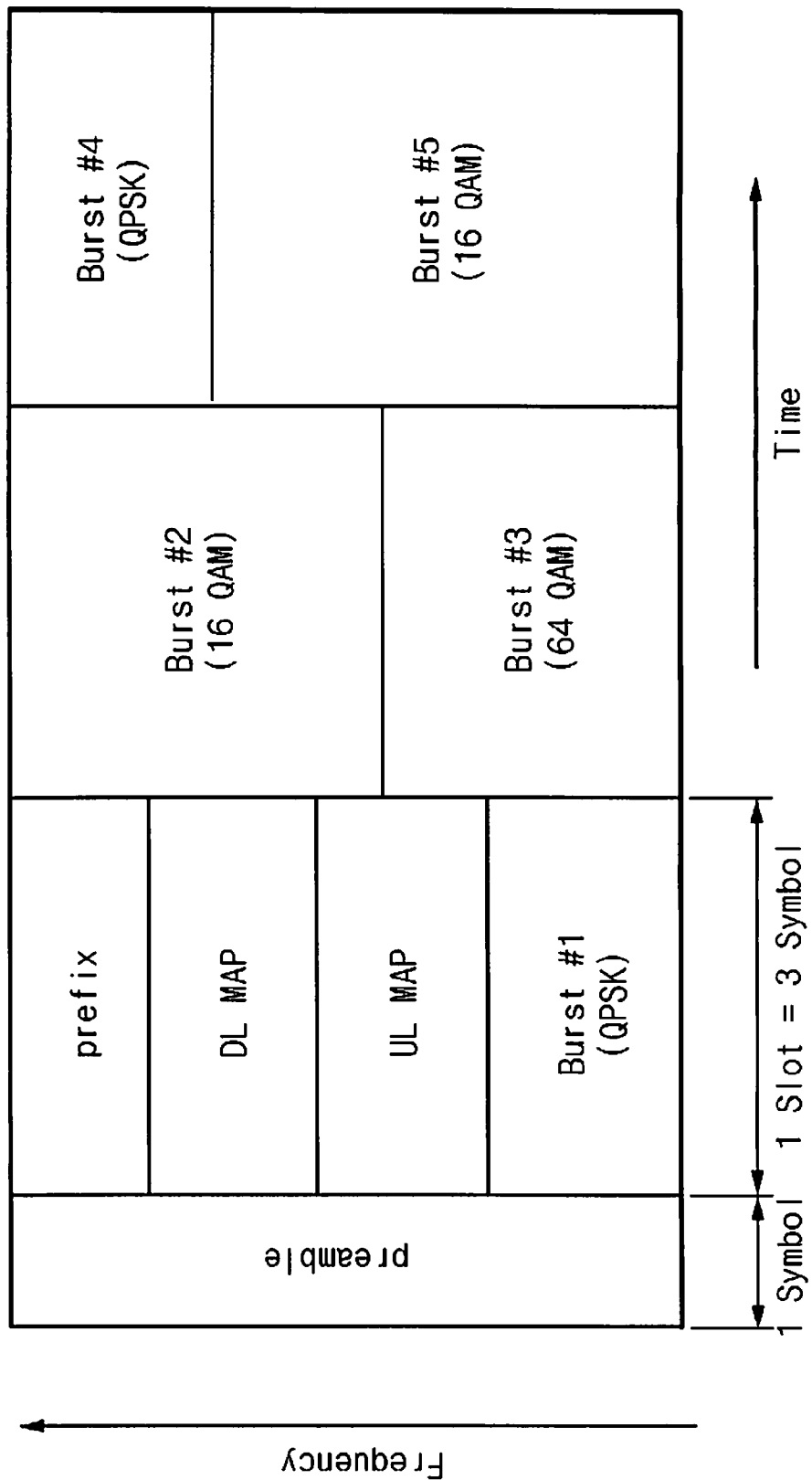
FIG. 1 shows an example of a packet to which an adaptive modulation and coding method is applied to in a general OFDMA system.
Figure 2:
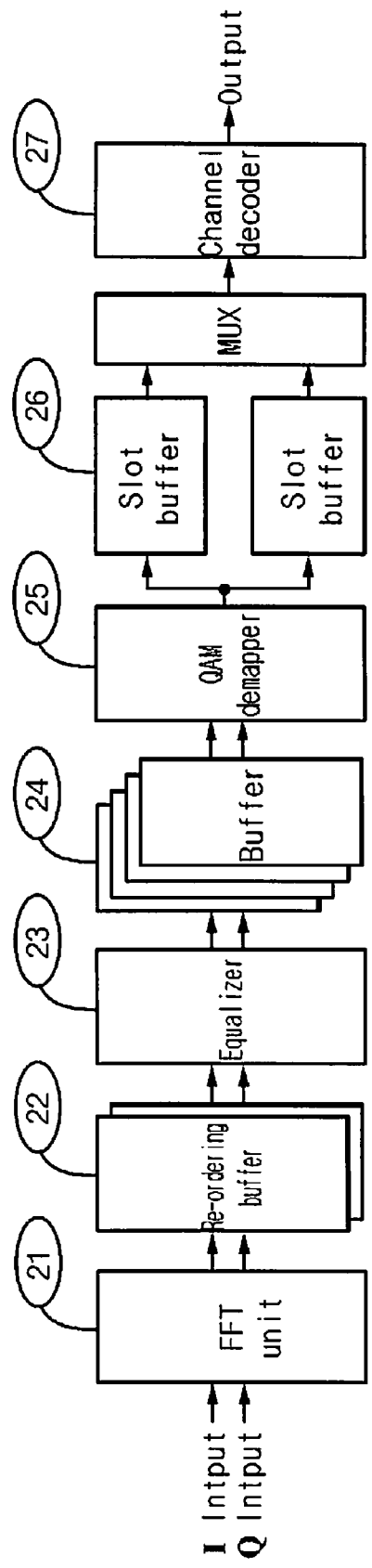
FIG. 2 shows a construction of a modulator for modulating a packet to which an adaptive modulation and coding method is applied to in a general OFDMA system.

Thus, the technical objective of the present invention is to solve the problems, and provides a demodulation apparatus in an OFDMA based packet communication system and a method thereof, minimizing a time delay by using the property of QAM constellation in the receiver, the time delay spending at analysis of a frame prefix, and MAP information.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Hereinafter, a demodulation apparatus in an OFDMA based packet communication system and method thereof according to the present invention is explained in detail with reference to the appended drawings.

FIG. 4 shows a constellation by a QAM demapper which is used in the general OFDMA based packet communication system. FIG. 4 indicates a constellation by QPSK, and FIG. 5 indicates a constellation by 16 QAM, and FIG. 6 indicates a constellation by 64 QAM.

As referred to in constellations shown in FIG. 4 and FIG. 5, it is found that 2 bits of data in front of the result of 16 QAM demodulation are the same with as that of QPSK demodulation. In the same manner, as referred to in constellations shown in FIG. 5 and FIG. 6, 4 bits of data in front of the result of 64 QAM demodulation are the same with as that of 16 QAM demodulation. Thus, this fact proves that a proper constellation can be selected, even though a modulation ratio increases.

Thus, the demodulator performs a 64 QAM demapping process to all sub-channels and accumulates data in slot buffers before a channel decoder, assuming that the modulation methods applied to all sub-channels of which the modulation method are unknown are 64 QAM, until analysis of the MAP information is finished. The channel decoder selectively reads data from the corresponding buffer, based on the modulation methods for each sub-channel known from analysis of MAP information.

For example, in the case data modulated by the QPSK is demodulated by the 64 QAM and is stored in the slot buffer as 6 bits of data, the channel decoder reads 2 bits of data in front of each 6 bits of data based on the analysis of MAP information indicating that a corresponding data was modulated by QPSK; and obtains original data before modulation. In another example, in the case data was modulated by the 16 QAM, the channel decoder reads 4 bits of data in front of each 6 bits of data. In the case data was modulated by the 64 QAM, the channel decoder reads all data since the modulation method is the same.

FIG. 7 shows a data construction stored in a slot buffer in a modulation method of QFDMA based packet communication system according to the present invention.

As referred to in FIG. 7, data of the sub-channels are demodulated by 64 QAM and stored in the slot buffers as 6 bits of data. In the case the original modulation method is the QPSK, 2 bits of data in front of 6 bits of data are valid data, and other data is invalid data. In the case the original modulation method is the 16 QAM, 4 bits of data in front of 6 bits of data are the valid data, and the other 2 bits are invalid data. In the case the original modulation method is the 64 QAM, all 6 bits of data is are valid data.

FIG. 6 shows a method for reading valid data from data in the slot buffer shown in FIG. 7, and relates to the case of 16 QAM. FIG. 8 shows an example using a readable signal, and FIG. 9 shows an example using a read address.

As referred to in FIG. 8, a read address for the slot buffer is continuously increased in order as 0, 1, 2, 3, A, B, C, D, etc., and is accessed to the slot buffer. However, a read enable signal corresponds to the former 4 addresses, the read enable signal allowing data corresponding to the address output since the modulation method was the 16 QAM. The slot buffer efficiently output the data corresponding to the front 4 addresses (for example, 0, 1, 2, 3) and does not output the data corresponding to the other 2 addresses (for example, 4, 5). Thus, the channel decoder controls only address read enable signals and reads only data corresponding to the modulation method, and can demodulate the data.

In the other manner, as referred to in FIG. 9, the read addresses for the slot buffer are not outputted in order and the modulation method was is the 16 QAM. Thus, the slot buffer efficiently outputs the data corresponding to the front 4 addresses (for example, 0, 1, 2, 3). The read enable signal continuously and validly occurs to allow the slot buffers to outputting the corresponding data except data corresponding to the remaining two addresses (for example, 4, 5). However, the slot buffer continuously outputs only 4 valid data corresponding to 4 addresses in front of 6 bits of data. Thus, the channel decoder controls only the read address and reads only data corresponding to the modulation method, and can demodulate the data.

In this case, a method for outputting only valid addressesd for extracting corresponding data shown in FIG. 9 can save more time than a method for extracting corresponding data by using the read enable signal shown in FIG. 8.

Figure 10:
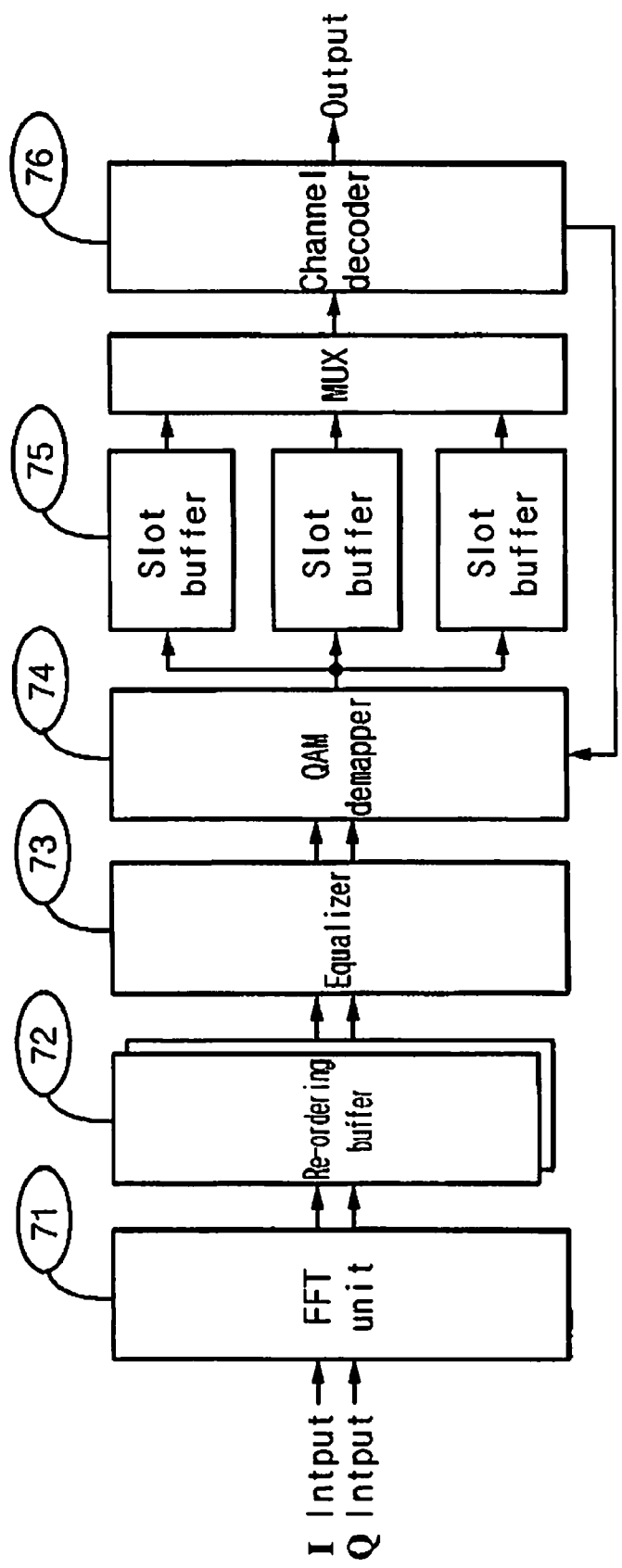
FIG. 10 shows a block diagram of a modulator in an OFDMA based packet communication system according to the exemplary embodiment.

FIG. 10 shows a block diagram of a modulator in an OFDMA based packet communication system according to the exemplary embodiment.

As shown in FIG. 10, a demodulator in an OFDMA based packet communication system according to the exemplary embodiment comprises a FFT unit 71, a re-ordering buffer 72, an equalizer 73, a QAM demapper 74, a slot buffer 75, and a channel decoder 76

The FFT unit 71 receives a packet sent from a sending device, which is treated by an adaptive modulation and coding method, and performs FFT to the packet, and transforms the packet to a frequency domain signal for output.

The re-ordering buffer re-orders the signal outputted from the FFT unit 71 and stores the signal for the next stage.

The equalizer 73 estimates a channel using the signal stored in the re-ordering buffer 72, and performs equalization of the signals.

The QAM demapper 74 performs a QAM demapping process to the signal outputted from the equalizer 73. At this time, the QAM demapper 74 performs a demapping process to sub-channels by a modulation method using a maximum modulation ratio until the modulation methods for each sub-channels are analyzed by the channel decoder 76. Once the modulation methods for each sub-channel are analyzed by the channel decoder 76, the QAM demapper 74 performs a demapping process to sub-channels by the modulation methods corresponding to each sub-channel. Assuming that the modulation method using a maximum modulation ratio is 64 QAM in the exemplary embodiment, the QAM demapper 74 performs a demapping process to sub-channels by 64 QAM until the modulation methods for each sub-channels are analyzed by the channel decoder 76. Once the modulation methods for each sub-channel are transferred to the QAM demapper, the QAM demapper 74 performs a demapping process to sub-channels by the modulation methods corresponding to each sub-channels.

The slot buffer 75 stores data for each slot demapped and outputted from the QAM demapper 74. At this time, the number of the slot buffers and the size of the slot buffers is are necessarily enough to store data outputted from the QAM demapper until the modulation methods for each sub-channels are analyzed by the channel decoder 76. Further, the number of the slot buffers and the size of the slot buffers are determined assuming that data of all sub-channels are demapped and outputted by the modulation method using the maximum modulation ratio. Thus, the real number and real size of the slot buffers 75 depends on the spending time for analyzing the frame prefix and MAP information in the OFDM symbols by the channel decoder 76. Further, the slot buffers 75 can further include a slot buffer for storing data outputted from the QAM demapper, once the modulation methods for each sub-channels are analyzed by the channel decoder 76; in addition to a slot buffer for storing data outputted from the QAM demapper until the modulation methods for each sub-channels are analyzed by the channel decoder 76.

The channel decoder 76 performs channel decoding by using the data stored in the slot buffer 75. At this time, the channel decoder 76 analyzes the modulation method at the each sub-channel from the data stored in the slot buffer 75, and then transfers the modulation method to the QAM demapper 74 so that the QAM demapper 74 performs a demapping process to the each sub-channels based on the corresponding modulation method. Meanwhile, with respect to the data demapped by the demodulation method using the maximum demodulation ratio and stored in the slot buffer 75 to this time, the channel decoder reads only valid data corresponding to the analyzed modulation method, and performs channel decoding.

More specifically, the channel decoder 76 reads the first slot stored in the slot buffer 75, that is, a frame prefix from the symbols stored in the first slot buffer 75, and analyzes the location and length of the MAP information and modulation method thereof. Further, the channel decoder 76 reads the sub-channel corresponding to the MAP information from the first slot buffer 75 by the analyzed modulation method, and obtains the information for each data sub-channels and transfers the information to the QAM demapper 74, and uses the information to read valid data from the slot buffer 75.

FIG. 11 shows action timing for modulating a packet in the modulator shown in FIG. 10.

Figure 3:
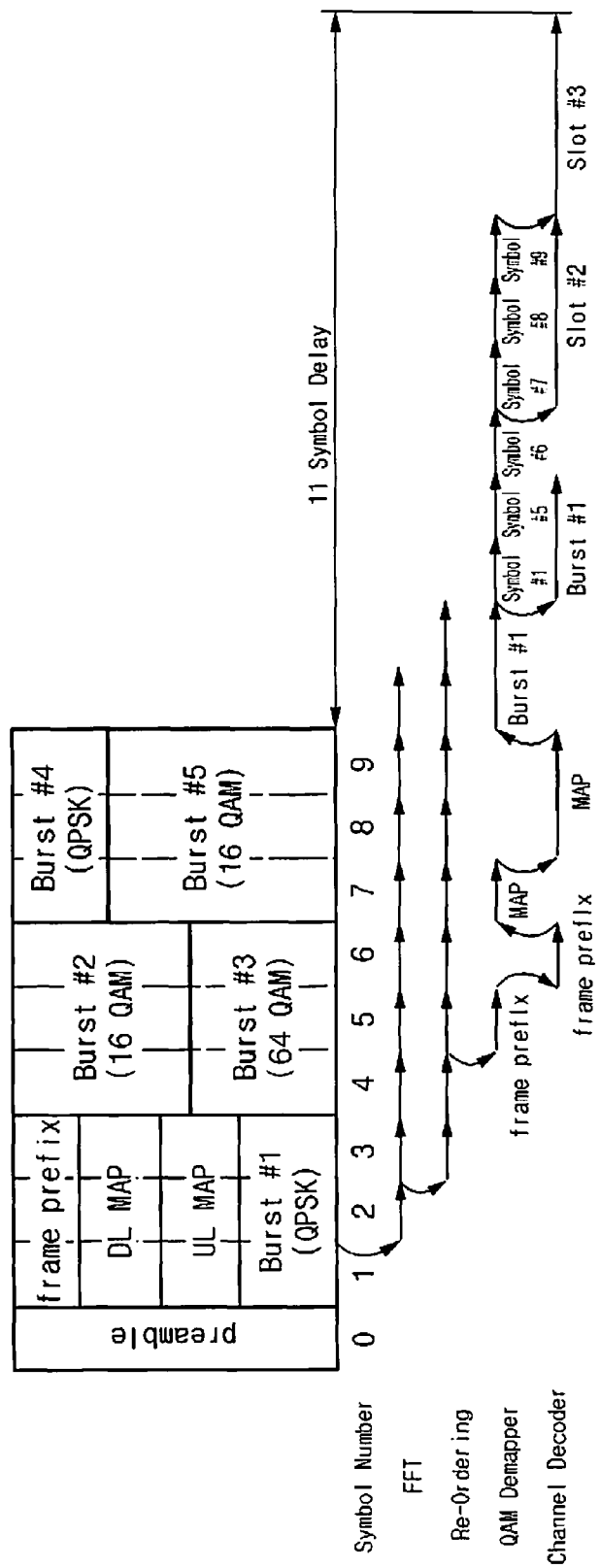
FIG. 3 shows action timing for modulating a packet in the modulator shown in FIG. 2.

As referred in to FIG. 11, delay by the FFT unit 71, and delay by the re-ordering buffer 72 and the QAM demapper 74 respectively occupies one symbol. The QAM demapper 74 can then continuously perform a symbol demapping process. The channel decoder 76 delays one symbol for analyzing the MAP information. Accordingly, the demodulation process is finished after six symbols when the packet frame is received according to the preferred embodiment, compared to the prior art in which the same is finished after eleven symbols as described with reference to FIG. 3.

The delay is increased by only one symbol, compareding with the OFDMA based packet communication system without an adaptive modulation and coding method, which results in a 5 symbol delay. This one symbol time delay results from analysis of the MAP information by the channel decoder 76. If there is hardware for analyzing the MAP information in at a high speed, such additional delay time is not needed for demodulation, comparing with the OFDMA based packet communication system without an adaptive modulation and coding method.

As mentioned in above, in at the time the early time delay may occurs, the QAM demapper demodulates data by the modulation method (here, 64 QAM) with the maximum modulation ratio and stores the data in the slot buffer, until the channel decoder analyzes the modulation method. Once the corresponding modulation method is analyzed, the channel decoder reads only valid data corresponding to the modulation method from the data stored in the slot buffer by using the property of the QAM constellation, and demodulates the data. Thus, it is not necessary to store data in a buffer located before the QAM demapper, for waiting on analysis of the modulation method by the channel decoder, and thus the buffer located before the QAM demapper is no longer needed any more.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A demodulation apparatus for receiving signals by an adaptive modulation and coding method, and demodulating the signals, in an OFDMA based packet communication system, comprising:
   a QAM demapper for performing a QAM (Quadrature Amplitude Modulation) demapping process on the received signals by a modulation method using a maximum modulation ratio, and outputting first data which have a number of bits corresponding to the modulation method using the maximum modulation ratio until modulation methods for each of the sub-channels are analyzed, and performing the QAM demapping process on the received signals by the modulation methods for each of the sub-channels and outputting second data which have a number of bits corresponding to the modulation methods for each of the sub-channels, when the modulation methods for each of the sub-channels are analyzed;
   a slot buffer for storing the first data and the second data outputted from the QAM demapper for each slot; and
   a channel decoder for decoding the data stored in the slot buffer, analyzing modulation methods for each of the sub-channels transferring the analyzed modulation methods to the QAM demapper, reading only valid data corresponding to the number of bits for the analyzed modulation methods from among all bits of the first data, demodulating the valid data, once the modulation methods for each of the sub-channels are analyzed by the channel decoder, reading all bits of the second data, demodulating the read bits of the second data, and outputting the demodulated data.

2. The demodulation apparatus in the OFDMA based packet communication system of claim 1, wherein the channel decoder controls read enable signals for controlling the data output stored in the slot buffer, and reads the valid data from the slot buffer.

3. The demodulation apparatus in the OFDMA based packet communication system of claim 1, wherein the channel decoder selectively outputs addresses being accessed to only valid data from among the data stored in the slot buffer, and reads the valid data from the slot buffer.

4. The demodulation apparatus in the OFDMA based packet communication system of claim 1, wherein the slot buffer comprises:
   a first slot buffer for storing the first data outputted from the QAM demapper until the modulation methods for each of the sub-channels of the received signals are analyzed by the channel decoder; and
   a second slot buffer for storing the second data outputted from the QAM demapper, once the modulation methods for each of the sub-channels of the received signals are analyzed by the channel decoder.

5. The demodulation apparatus in the OFDMA based packet communication system of claim 4, wherein the first slot buffer stores the first data demapped by the modulation method using the maximum modulation ratio in the QAM demapper; and
   the second slot buffer stores the second data demapped by the modulation methods analyzed for each of the sub-channels in the QAM demapper.

6. The demodulation apparatus in the OFDMA based packet communication system of claim 1, wherein the channel decoder reads the MAP information in the former part of a frame among the symbol data stored in the slot buffer, and analyzes the modulation methods for each of the sub-channels.

7. The demodulation apparatus in the OFDMA based packet communication system of claim 1, wherein the QAM demapper performs a demapping process on the received signals by the modulation methods for each of the sub-channels, and stores the output data in the slot buffer, once the modulation methods for each of the sub-channels are analyzed by the channel decoder.

8. The demodulation apparatus in the OFDMA based packet communication system of claim 1, wherein in the case data are demodulated by the modulation method using the maximum modulation ratio, a constellation for part of the data is identical with a constellation for the data demodulated by the modulation methods for each sub-channels.

9. The demodulation apparatus in the OFDMA based packet communication system of claim 8, wherein the demodulation apparatus further comprises:
- an FFT (Fast Fourier Transform) unit for performing FFT on the received signals and outputting the signals;
- a re-ordering buffer for re-ordering the signals outputted from the FFT unit and storing the signals; an equalizer for estimating channels using the signals stored in the re-ordering buffer and performing equalization of the signals, and outputting the signals to the QAM demapper.

10. The demodulation apparatus in the OFDMA based packet communication system of claim 1, wherein in the case the modulation method using the maximum modulation ratio is 64 QAM, and a data unit for storing in the slot buffer is 6 bits of data, the valid data by the 16 QAM modulation method are former 4 bits of data from among the 6 bits of data.

11. The demodulation apparatus in the OFDMA based packet communication system of claim 1, wherein in the case the modulation method using the maximum modulation ratio is 64 QAM, and a data unit for storing in the slot buffer is 6 bits of data, the valid data by the QPSK modulation method are 2 bits of data in front of the 6 bits of data.

12. A demodulation method for receiving signals by an adaptive modulation and coding method and demodulating the signals, in an OFDMA based packet communication system, the method comprising the steps of:
- a) performing a demapping process on the received signals by a modulation method using a maximum modulation ratio and storing first data which have a number of bits corresponding to the modulation method using the maximum modulation ratio;
- b) decoding the first data and analyzing the modulation methods for each of the sub-channels; and
- c) performing a demapping process on the received signals by the analyzed modulation methods for each of the sub-channels outputting second data which have a number of bits corresponding to the modulation methods for each of the sub-channels, and demodulating the first data and the second data, wherein the first data are stored in step a) until the modulation methods for each of the sub-channels are analyzed, only valid data corresponding to the number of bits for the analyzed modulation methods are read from among all bits of the first data, once the modulation methods for each of the sub-channels are analyzed, all bits of the second data are read, and the valid data and the read bits of the second data are demodulated.

* * * * *